Patented Nov. 18, 1952

2,618,622

UNITED STATES PATENT OFFICE 2,618,622

PLASTICIZER FOR VINYL HALIDES

Oliver J. Grummitt and Robert E. Blank, Cleveland, Ohio, and Herbert F. Schwarz, Flossmoor, Ill., assignors to The Sherwin-Williams Company, Cleveland, Ohio, a corporation of Ohio No Drawing. Application January 17, 1950, Serial No. 139,128

8 Claims. (Cl. 260—31.6)

This invention relates to synthetic resins and is primarily concerned with compositions of the halogen-containing polymer type which are beneficially plasticized, and which are remarkably resistant to decomposition induced by heat and light.

Polymeric compositions such as polyvinyl chloride, polyvinyl fluoride, and co-polymers thereof, such as polyvinyl chloride-polyvinyl acetate, are frequently too stiff and inflexible for practical usage as extruded sheets, molded objects, unsupported films, coated fabrics, and coating compositions. While plasticizers for these and other resins are well known, this invention comprises agents having not only this general property of imparting plasticity, but also the highly desirable and unforeseen properties of substantially complete compatibility without bleeding at the surface, clarity, heat and light stability, inertness with respect to paint, varnish, and lacquer films with which the polymer may come in contact, and resistance to extraction on immersion in water, oil, etc.

Many different types of materials have been added heretofore to polymers of the type herein contemplated to impart plasticity. Dioctyl phthalate, dibutyl phthalate, triphenyl phosphate, and many other well known esters have been so used. However, dioctyl phthalate, for example, which is a widely used plasticizer, yields a composition which is not stable to heat or light for any substantial period.

It is a principal object of the present invention to provide an improved plasticized halogen-containing polymeric resin, e. g., vinyl halide polymers, characterized by substantially complete compatibility of the plasticizer without bleeding at the surface, improved heat and light stability, inertness to paint, varnish and lacquer films, and resistance to extraction of the plasticizer on immersion in water, oil, etc.

Other objects of this invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Broadly stated, our invention is in the provision of a composition comprising a polyvinyl halide resin containing a major amount of polyvinyl halide, and a mono-(hydroxy-aliphatic) acid ester of a polyhydric alcohol in which ester from 75% to 100% of the available free hydroxyl groups have been acylated with an aliphatic acyl compound having the general formula:

$$R-X$$

where R is an aliphatic acyl radical of 1 to 6 carbon atoms, and X is selected from —OH, —SH, —O—R, —S—R, and halogen. More particularly, our invention is in the provision of a composition having as a major constituent thereof a polyvinyl halide, which composition has been plasticized with from 1 to 80 parts per 100 parts of polymer of a mono-ricinoleate of a polyhydric alcohol, in which ester from 75% to 100% of the hydroxyl groups have been acetylated.

The halogen-containing polymers into which the plasticizers of this invention may be incorporated include the vinyl chloride polymers, the vinyl fluoride polymers, the vinyl bromide polymers and copolymers thereof with vinyl alcohol or a vinyl ester of an aliphatic acid, such as vinyl acetate. A class of vinyl copolymers with which the plasticizers of this invention may be used to advantage are the vinyl chloride-vinyl acetate copolymers containing therein about 60% to 95% by weight of vinyl chloride. This class of resin is disclosed in the patent to Reid, 1,935,577. Other useful vinyl resins are disclosed in the patent to Semon, 1,929,453. We may also use mixed resins, e. g. a mixture of polyvinyl chloride and a copolymer of polyvinyl chloride with polyvinyl acetate, or polyvinyl cyanide. Satisfactory results are obtained with the vinylidene halides. Thus where we refer to a vinyl halide resin herein and in the appended claims, we intend any of the foregoing vinyl halide-containing resins it being understood that the vinylidene halides are substantially equivalent thereto for the purposes of this invention. By "major amount" we mean in excess of 50% vinyl halide up to and including 100% of a particular vinyl halide.

The polyhydric alcohol from which the base ester is formed or of which said ester constitutes a derivative, may be a glycol, such as ethylene glycol, propylene glycol, or the like, glycerol, trimethylolethane, pentaerythritol, mannitol, sorbitol, and the like. Of these we prefer glycerol.

The aliphatic compound capable upon reaction of yielding the acyl radical of 1 to 6 carbon atoms may be in the form of carboxylic acid, the anhydride, or the acid halide, e. g. chloride or bromide. We may use the thio analogues of the acid and anhydride, e. g. the thiol carboxylic acids and the thiol anhydrides yielding acyl groups of from 1 to 6 carbon atoms.

Specific examples of such materials include formic acid, acetic acid, acetic anhydride, acetyl chloride, propionic acid, thiol propionic acid, propionyl chloride, butyric acid, iso-butyric acid, thiol butyric acid, pentanoic acids, thiol pentanoic acids, hexanoic acids, etc. The presence of halogen atoms in the molecule in an inactive position, such as the omega position on the 4, 5 and 6 carbon atom acyl radical providing compounds, as well as oxygen in the form of keto or ether groups in the aliphatic residue of the acid may be tolerated, although we prefer the alkyl acids and anhydrides having from 1 to 6 carbon atoms in each acyl group, and particularly acetic acid and acetic anhydride.

The base ester, for example, a mono-ricinoleate of a polyhydric alcohol, may be synthesized, or derived from the glyceride, such as castor oil. It is clear that in any case, except where expensive fractionation procedures are employed, that the resultant product will be a mixture of mono-fatty acid esters and the higher substituted esters. However, we intend by the term "mono-ricinoleic acid ester" to cover a synthetic or derived ester wherein the quantities of reactants and reagents employed in either the synthesis or derivation are such as to favor the formation of the mono-ricinoleate. Thus, where castor oil is treated with glycerine to form the "monoglyceride" the amount of glycerine employed will be preferably at least that which stoichiometrically favors monoglyceride formation, although it is recognized that the resultant product contains mono-, di-, and tri-ricinoleate, as well as minor amounts of glycerides of other acids which are present in castor oil. Such a mixture may then be acylated, or a separation of the monoglyceride effected by a suitable process, such as solvent extraction or fractional crystallization from hot alcohol, and the monoglyceride then acylated, although such a separation has been found to be unnecessary. The fatty acid radical is broadly a hydroxy-aliphatic acyl group containing from 18 to 24 carbon atoms and preferably at least 1 hydroxyl group. Unsaturation may also occur in such acyl radical.

The following examples are illustrative of the alcoholysis of castor oil with glycerine, the acylation step and the blending with a vinyl halide resin. It is to be understood that these examples are for illustrative purposes only, i. e., to demonstrate a preferred method by which the compositions of this invention may be produced, and are not to be construed as limiting the invention to the precise example or conditions shown.

EXAMPLE I

The synthesis of a typical plasticizer based on ricinoleic acid, glycerol, and acetic acid is as follows. A mixture of 1868 g. of refined grade of castor oil and 553 g. of glycerol was heated to 160° C. and 7.5 ml. of a calcium naphthenate solution (consisting of 5% calcium as the naphthenate dissolved in mineral spirits) was added. The calcium naphthenate acts as a catalyst for the alcoholysis reaction between the oil and glycerol. The mixture was gradually heated to 210–215° C. and held for 3 hours with efficient stirring. After cooling to room terperature and standing for one half hour the excess glycerol (lower layer) was removed by centrifuging. The product weighed 2200 g. Its hydroxyl content was 13.8% Gardner color, 3–5, and specific gravity (25/25) about 1.00.

Since castor oil contains 80–85° of ricinoleic acid groups, minor components are the glycerides of other acids such as oleic, linoleic, and stearic.

The glyceride mixture, 2200 g., was heated to 160–165° C. and acetylated by the careful portionwise addition of 1920 g. of acetic anhydride. After the addition the mixture was heated at gentle reflux for one-half hour, transferred to a Claisen distilling flask, and stripped at 75–140° C. (pot temperature) and at a reduced pressure of 30–40 mm. to remove most of the acetic acid. The final stripping was done at 140–150° C./4–6 mm. The hot residue was suction filtered to remove traces of calcium soaps. The yield of plasticizer was 2835 g., hydroxyl content 0–0.3%, acid number 0.5–1.5, saponification number 420, Gardner color 6–9, specific gravity at 25/25 about 1.02.

The amount of acetic anhydride in this case was in slight excess of the amount needed to esterify all of the hydroxyl groups, because the presence of large amounts of free alcohol groups has been found to reduce the compatibility and efficiency of the plasticizer.

EXAMPLE II 100 parts by weight of a copolymer of vinyl chloride and vinyl acetate (93% vinyl chloride and 7% vinyl acetate) was mixed thoroughly with 50 parts by weight of the acetylated monoglyceride of castor oil of Example 1, and milled for 2 minutes at 149° C. on a two roll mill. The milled sheet was molded for 30 seconds under 2000 pounds per square inch pressure in a hydraulic press heated to 149° C., to give colorless, transparent, six inch square sheets, approximately 0.090 inch thick. Samples from this sheet and samples from a sheet containing dioctyl phthalate (50 parts) as the sole plasticizer were similar in physical properties (see Table I), but the samples containing the acetylated monoglyceride of castor oil were more resistant to the deteriorating action of heat and light as is shown in Table I.

TABLE I

*Plasticizer tests in vinyl chloride-vinyl acetate copolymer*

| | Dioctyl Phthalate (50 Parts) | Acetylated Monoglyceride of Castor Oil (50 Parts) |
|---|---|---|
| 1. Ability to form a sheet during milling operation. | Good | Good. |
| 2. Blooming or exuding of plasticizer to surface of sheet: | | |
|   a. After 60 days standing at room temperature. | None | None. |
|   b. After 28 days in Everready ultra violet light tester. | do | Do. |
| 3. Color of original sheet | do | Do. |
| 4. Transparency of original sheet | Clear | Clear. |
| 5. Hardness (shore durometer, A) | 94 | 94. |
| 6. Modulus at 100 percent elongation | 3,330 | 3,390. |
| 7. Elongation at break (percent) | 150 | 120. |
| 8. Ultimate tensile strength (p. s. i.) | 3,810 | 3,550. |
| 9. Heat loss (percent loss after 96 hrs. in oven at 100° C.). | 3.0 | 2.7. |
| 10. Water absorption (percent gain after 7 days immersion at 85° C.). | 7.4 | 7.7. |
| 11. Heat stability (15 min. in oven at 150° C.). | Poor | Good. |
| 12. Light stability (12 days in Everready twin carbon arc ultra violet light tester). | do | Do. |
| 13. Oil extraction (A. S. T. M. method D-543-43; using white mineral oil—10 days at 25° C.), percent. | 0.07 | 0.19. |
| 14. Low temperature brittle point (A. S. T. M. method D-736-43T, temperature at which cracking occurs—°C.). | −26 | −36. |

EXAMPLE III

A further example of the preparation of an acylated monoglyceride of castor oil is as follows:

210 grams (0.48 mol on the basis of 85% ricinoleic acid in the monoglyceride) of castor oil monoglyceride such as produced in accordance with Example I and 170 grams (1.55 mols) of acetic anhydride were refluxed carefully for 3 hours. 500 ml. of ether were added and the solution washed with a 500 ml. portion and then with several 100 ml. portions of water. The ether layer was stripped at 100–150° C./40 mm. to give 222 grams (calculated 269 grams) of acetylated monoglyceride castor oil. The percentage yield in this case is 82.4% and the product had a neutralization number less than 0.1.

EXAMPLE IV 100 parts by weight of a polymer of vinyl chloride was thoroughly mixed with dioctyl phthalate (25 parts by weight) and the acetylated monoglyceride of castor oil of Example I (25 parts by weight). Another 100 parts of a polymer of vinyl chloride was thoroughly mixed with 50 parts by weight of the acetylated monoglyceride of castor oil of Example I. Each batch was milled for two minutes at 149° C. on a two roll mill. The milled sheets were molded for 30 seconds under 2,000 pounds per square inch pressure in a hydraulic press heated to 149° C., to give colorless, transparent, six inch square sheets, approximately 0.090 inch thick. Samples from these sheets and samples from a sheet containing dioctyl phthalate (50 parts) as the sole plasticizer were similar in physical properties, but the samples containing the acetylated monoglyceride of castor oil were more resistant to the deteriorating action of heat and light as is shown in Table II.

The ratio of reactants may be varied. In Example I, above, the mol ratio of glycerol to castor oil is 3:1, respectively. Theoretically, the monoglyceride requires a ratio of 2:1, but the reversible nature of the reaction is responsible for an equilibrium mixture of mono-, di-, and triglycerides along with unreacted glycerol. To favor monoglyceride formation, a ratio greater than 2:1 may be used. Suitable products are obtained, however, at ratios above or below 2:1.

As indicated above, an alternative route to this mixture of partial esters is by direct esterification of the polyhydric alcohol, e. g. glycerol with fatty acids, e. g. ricinoleic acid. The mixture of mono-, di-, and triglycerides and glycerol, for example, can be made equally well in this way, although it is usually more convenient and economical to use the alcoholysis reaction.

Throughout the foregoing description we have referred to ricinoleates as derived from castor oil. This is a preferred material for use in accordance with this invention. However, instead of castor oil, other animal or vegetable oils, or mixtures thereof, such as fish, soyabean, linseed, etc. may be used. These are not as desirable as the preferred natural oil since it has been found that improved plasticizing activity is obtained when free hydroxyl groups are initially present in the fatty acid radical. Oils based on ricinoleic, dihydroxy stearic and the like, or synthetics thereof, constitute the preferred class for use in this invention.

With respect to compatibility, it has been found that where amounts sufficient to give the desired degree of plasticity are to be employed, at least 75% of the available hydroxyls in the base ester molecule, that is, remaining hydroxyls of the polyhydric alcohol plus any hydroxyls in the fatty acid radical of the base ester, should be

TABLE II
*Plasticizer tests in vinyl chloride polymer*

| | Dioctyl phthalate (50 parts) | Dioctyl phthalate (25 parts) and acetylated monoglyceride of castor oil (25 parts) | Acetylated monoglyceride of castor oil (50 parts) |
|---|---|---|---|
| 1. Ability to form a sheet during milling operation | Good | Good | Good. |
| 2. Blooming or exuding of plasticizer to surface of sheet: | | | |
| a. After 60 days standing at room temperature | None | None | None. |
| b. After 28 days in Eveready ultra violet light tester | do | do | Do. |
| 3. Color of original sheet | do | do | Do. |
| 4. Transparency of original sheet | Clear | Clear | Clear. |
| 5. Hardness (shore durometer, A) | 85 | 86 | 90. |
| 6. Modulus at 100 percent elongation | 1,520 | 1,420 | 1,530. |
| 7. Elongation at break (percent) | 200 | 260 | 250. |
| 8. Ultimate tensile strength (p. s. i.) | 2,420 | 2,430 | 2,540. |
| 9. Heat loss (percent loss after 96 hrs. in oven at 100° C.) | 4.7 | 5.0 | 4.6. |
| 10. Water absorption (percent gain after 7 days immersion at 85° C.) | 1.3 | 2.8 | 6.0. |
| 11. Heat stability (3 hrs. in oven at 150° C.) | Poor | Good | Good. |
| 12. Light stability (28 days in Eveready twin carbon arc ultra violet light tester) | do | do | Do. |
| 13. Oil extraction (A. S. T. M. method D–543–43; using white mineral oil—10 days at 25° C.), percent. | 1.0 | 1.3 | 1.8. |
| 14. Low temperature brittle point (A. S. T. M. method D–736–43T, temperature at which cracking occurs—°C.) | −58 | −44 | −44. |

The catalyst and temperatures given in Example II are not critical. Instead of calcium naphthanate, any of the well known alcoholysis catalysts, such as litharge, lime, sodium hydroxide, etc. may be used. Catalyst, reaction rate, and reaction temperature should be such that the alcoholysis reaction proceeds substantially to equilibrium. The temperature of the acylation need only be such that the reaction between the alcohol groups and the acylation reactant takes place at a convenient rate.

acylated with an acyl radical of from 1 to 6 carbon atoms. We have found that higher molecular weight acylating compounds tend to decrease compatability.

The plasticizers of this invention are also useful as softening agents for nitrocellulose, synthetic rubber, etc. making such materials more flexible and extensible.

In general, we blend the plasticizers of this invention in the resins, e. g. vinyl halide resins, in amounts ranging from 1 to 80 parts per 100 parts of polymer, either as the sole agent, or in combination with other well known plasticizing agents, such as the phthalates, phosphates, etc. in ratios ranging from 1:10 to 10:1 as the particular needs of the final resin may require. Usually where a combination of plasticizers is employed, the ratios are about 1:1 to 1:3, the plasticizer of this invention being represented by the last figure in these ratios.

Other resin additives, such as pigments, fillers, extenders, solvents, etc. may be present in the compositions of this invention in the amounts ordinarily employed for the purposes indicated.

TABLE III

| | | | | | |
|---|---|---|---|---|---|
| Parts dioctyl phthalate | 50 | 25 | 25 | 25 | 25. |
| Additional plasticizer | None | x. I | A¹ | B¹ | C.¹ |
| Parts additional plasticizer | | 25 | 25 | 25 | 25. |
| Compatibility | Good | Good | Good | Good | Good. |
| Blooming: | | | | | |
| Room temp. 60 days | None | None | None | Considerable | None. |
| After light test | do | do | Considerable | Slight | Considerable. |
| Color | do | do | None | None | None. |
| Transparency | Clear | Clear | Clear | Cloudy | Clear. |
| Hardness (shore) | 89 | 89 | 84 | 89 | 85. |
| Modulus at 100 percent | 1,480 | 1,690 | 1,250 | 1,440 | 1,560. |
| Elongation percent | 200 | 190 | 240 | 190 | 210. |
| Tensile strength | 2,100 | 2,380 | 2,220 | 2,030 | 2,430. |
| Volatility (percent loss after 96 hrs. at 100° C.) | 5.5 | 5.8 | 10.1 | 7.0 | 6.1. |
| Water absorption (percent gain after 7 days at 85° C.) | 1.4 | 2.2 | 1.9 | 2.0 | 1.8. |
| Heat stability (3 hours at 150° C.) | Poor | Good | Fair | Good | Good. |
| Light stability (exposed 28 days to Eveready twin carbon arc). | do | do | Good | do | Do. |

¹ Commercial plasticizers.

Other objects of our invention appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Other modes of applying the principal of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. A composition comprising a polyvinyl halide containing resin, and as a plasticizer therefor, from about 1 to 80 parts per 100 parts of resin, of a mono-(hydroxy aliphatic) acid ester of a polyhydric alcohol in which ester the aliphatic group contains from about 18 to about 24 carbon atoms, and in which ester the hydrogen atom in from 75% to 100% of the available free hydroxyl groups is replaced by an aliphatic acyl radicle containing from 1 to 6 carbon atoms.

2. A composition comprising a polyvinyl chloride containing resin, and as a plasticizer therefor, from about 1 to about 80 parts per 100 parts of resin, of a mono-(hydroxy aliphatic) acid ester of a polyhydric alcohol in which ester the aliphatic group contains from about 18 to about 24 carbon atoms, and in which ester the hydrogen atom in from 75% to 100% of the available free hydroxyl groups is replaced by an aliphatic acyl radicle containing from 1 to 6 carbon atoms.

3. A composition in accordance with claim 2 in which the (hydroxy aliphatic) acid is predominantly ricinoleic acid.

4. A composition in accordance with claim 2 in which the mono-(hydroxy aliphatic) acid ester is derived from castor oil.

5. A composition in accordance with claim 2 in which the polyhydric alcohol is glycerol.

6. A composition in accordance with claim 2 in which the aliphatic acyl compound is a mono-carboxylic fatty acid of 1 to 6 carbon atoms.

7. A composition in accordance with claim 2 in which the aliphatic acyl compound is an anhydride of a mono-carboxylic fatty acid of 1 to 6 carbon atoms.

8. A composition in accordance with claim 2 in which the aliphatic acyl compound is acetic anhydride.

OLIVER J. GRUMMITT.
ROBERT E. BLANK.
HERBERT F. SCHWARZ.

REFERENCES CITED

The following references are of record in the file of this patent:

UNITED STATES PATENTS

| Number | Name | Date |
|---|---|---|
| 2,156,956 | Agens | May 2, 1939 |
| 2,310,395 | Carruthers | Feb. 9, 1943 |